C. F. A. BANDER.
Vegetable Cutter.
No. 53,392.
Patented March 27, 1866.
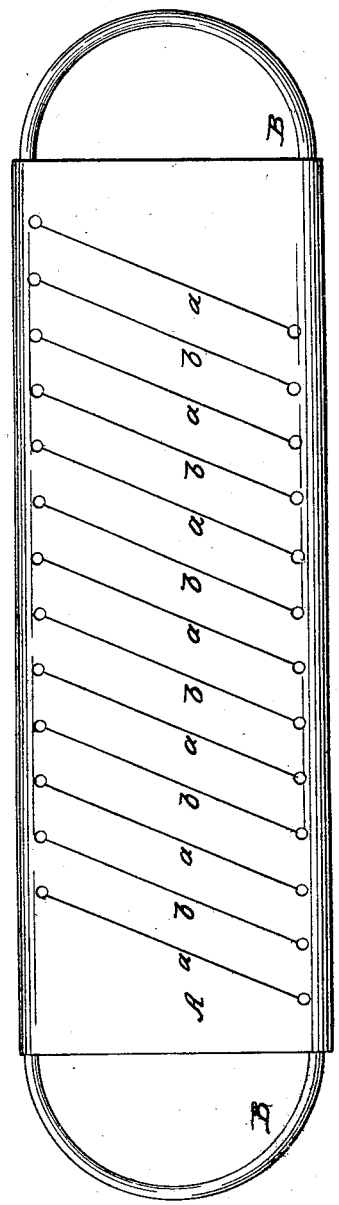

UNITED STATES PATENT OFFICE.

C. F. A. BAUDER, OF NEWARK, NEW JERSEY.

IMPROVED VEGETABLE-CUTTER.

Specification forming part of Letters Patent No. 53,392, dated March 27, 1866.

*To all whom it may concern:*

Be it known that I, C. F. A. BAUDER, of Newark, Essex county, State of New Jersey, have invented a new and Improved Vegetable-Cutter; and I do hereby declare that the following is a full, clear, and exact description thereof, which will enable others skilled in the art to make and use the same, reference being had to the accompanying drawings, forming part of this specification, in which—

Figure 1 represents a plan or a top view of this invention; Fig. 2 is a longitudinal vertical section of the same.

Similar letters of reference indicate like parts.

This invention consists in a vegetable-cutter made of a piece of sheet metal by cutting into said piece a series of inclined slots and turning the intervening pieces up in such a manner that each of the pieces thus turned up forms a double cutting-edge, one on each side, and a vegetable-cutter is obtained which can be made cheap, which operates equally well on both sides, and which can be sharpened with little trouble.

A represents a piece of sheet metal, tinned sheet-iron being used by preference. The edges of this piece are turned up and strengthened by a wire, B, which is brought in such a shape that it forms two handles, one on either end of the piece A. Said piece is perforated with a series of inclined slots, *a*, cut in at suitable distances apart, and the strips *b*, which intervene between the slots *a*, are turned up to an inclination of a few degrees with the plane of the sheet A, as shown in Fig. 2. The edges of the strips *b* are sharpened with a file or in any other suitable manner, and each strip is thus provided with two cutting-edges, and a series of cutters are obtained which serve to slice potatoes, turnips, cucumbers, or other vegetables with the greatest nicety.

My vegetable-cutter can be used on both sides with equal facility. It can be made cheap, and it is of great convenience for housekeepers.

What I claim as new, and desire to secure by Letters Patent, is—

A vegetable-cutter made of a piece of sheet metal, A, which is slotted so as to form a series of strips, *b*, with double cutting-edges, substantially in the manner herein set forth.

The above specification of my invention signed by me this 6th day of February, 1866.

CHARLES F. A. BAUDER.

Witnesses:
M. M. LIVINGSTON,
W. HAUFF.